United States Patent
Tashiro et al.

(10) Patent No.: US 8,300,353 B2
(45) Date of Patent: Oct. 30, 2012

(54) DISK DRIVE DEVICE HAVING FUNCTION OF DISCHARGING STATIC ELECTRICITY

(75) Inventors: Tomoyuki Tashiro, Shizuoka (JP); Yuji Omura, Shizouka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 168 days.

(21) Appl. No.: 12/622,408

(22) Filed: Nov. 19, 2009

(65) Prior Publication Data
US 2011/0116188 A1    May 19, 2011

(51) Int. Cl.
*G11B 33/08* (2006.01)
(52) U.S. Cl. ..................................... 360/97.12
(58) Field of Classification Search .......... None
See application file for complete search history.

(56) References Cited

U.S. PATENT DOCUMENTS
2006/0215312 A1* 9/2006 Sumi et al. ............... 360/99.08

FOREIGN PATENT DOCUMENTS

| | | |
|---|---|---|
| JP | 2004-289982 | 10/2004 |
| JP | 2006003342 A | 1/2006 |
| JP | 2006046430 A | 2/2006 |
| JP | 2006147853 A | 6/2006 |
| JP | 2006187066 A | 7/2006 |
| JP | 2008165951 A | 7/2008 |
| JP | 2008198697 A | 8/2008 |
| WO | 2008069226 A1 | 6/2008 |

OTHER PUBLICATIONS

Japan Office Action, May 22, 2012, 4 pages.

* cited by examiner

*Primary Examiner* — David D Davis
(74) *Attorney, Agent, or Firm* — Fulwider Patton LLP

(57) ABSTRACT

A bearing unit includes a shaft and a hub as a conductive rotating body that supports a recording disk. Also, the bearing unit includes a conductive resin housing configured to surround at least part of the shaft to support the shaft and to be able to conduct electricity to the recording disk via the shaft. The conductive resin housing includes a conductive adhesive to be applied to secure conduction with the base housing. The conductive resin housing has an exposed portion where the inner layer of the conductive resin housing is exposed, at a position to which the conductive adhesive is applied.

18 Claims, 6 Drawing Sheets

DISK DRIVE DEVICE HAVING FUNCTION OF DISCHARGING STATIC ELECTRICITY

BACKGROUND OF THE INVENTION

1. Field of the Invention

The present invention relates to a disk drive device, and in particular, to a structure for discharging static electricity charged in a disk drive device.

2. Description of the Related Art

Recently, a technique for improving a recording density of a fixed disk drive device (hereinafter, simply referred to as a disk drive device) has been rapidly developed, and with this, a recording capacity has been drastically enhanced. In such a disk drive device, data are magnetically recorded on a recording disk rotating at a high-speed. Because such a recording disk rotates at a high-speed in air, the disk is sometimes charged with static electricity. A large amount of static electricity charged in a recording disk may cause a discharge breakdown of a magnetic head or a breakdown of the data recorded on the disk. In order to prevent such a charge of static electricity in a recording disk, a conductive path for grounding the static electricity charged in the recording disk is required to be secured within a disk drive device. A disk drive device is structured with a hub supporting a recording disk, a shaft to which the hub is fixed, a bearing member housing the shaft, and a base housing (also referred to as a motor base) that houses part of the bearing member, etc., each of which can be formed of a conductive material. Accordingly, the conductive path for discharging the static electricity charged in a recording disk can be, for example, secured by electrically connecting the hub supporting a recording disk, the shaft, the bearing member and the base housing together.

When securing the conductive path among the respective components, it is better that the path is secured by direct contacts among the components; however, a reliable connection method has to be selected for the portion where components have to be firmly fixed together, such as the portion where the bearing member and the base housing are connected together. When two components are to be firmly fixed together by inserting one of the two into an opening portion of the other, such as the case of the bearing member and the base housing, press-fitting can be considered. However, in the case of the component such as the bearing member that rotatably supports the shaft, while being spaced apart by a gap of several μm from the shaft, deformation of the component has to be avoided. Therefore, it is preferable that a connection method in which an external force is hardly applied to the bearing member is adopted.

Due to the aforementioned situations, the bearing member and the base housing have been conventionally combined together by a loose fit such that the two are fixed together by filling an adhesive therebetween, in many cases. In this case, however, there is a problem that conductivity between the bearing member and the base housing cannot be secured because an adhesive is filled therebetween. Methods for securing the conductivity between the bearing member and the base housing include caulking, welding and soldering, etc.; however, these methods are not preferable, because a large external force or a high-temperature is applied to a component during work, so that the component is likely to deform. Therefore, a method using a conductive adhesive by which adhesion involving conductivity is possible, is proposed as disclosed in Japanese Patent Application Publication 2004-289982.

As stated above, the bearing member has been required to have conductivity to discharge the statistic electricity charged on the disk side via the base housing. A sleeve and a housing of which the bearing member is composed are formed of a metal such as a copper material; however, there have been demands that these components should be formed of a material that is light in weight and suitable for mass production, in terms of weight reduction or cost reduction. Even in the case, it has to be taken into account that sufficient conductivity performance is secured and the conductivity property is not varied in each product.

SUMMARY OF THE INVENTION

The present invention has been made in view of these situations, and a purpose thereof is to provide a disk drive device configured to have good productivity and to stably discharge static electricity charged on a disk side via a base housing.

In order to solve the aforementioned problems, an embodiment of the present invention relates to a disk drive device. The disk drive device comprises: a base housing configured to have conductivity in at least part thereof; a bearing unit configured to be arranged inside the base housing and to rotatably support a recording disk relative to the base housing; and a drive unit configured to rotationally drive the recording disk supported by the bearing unit, wherein the bearing unit includes: a conductive rotating body configured to support the recording disk; a conductive resin housing configured to surround at least part of the rotating body to support the rotating body and to be able to conduct electricity to the recording disk via the rotating body; and a conductive paint that is applied to secure conduction between the conductive resin housing and the base housing, and wherein the conductive resin housing has an exposed portion where an inner layer thereof is exposed at a position to which the conductive paint is applied.

The bearing unit includes a conductive rotating body, and a conductive resin housing configured to support the rotating body and to be able to conduct electricity with a recording disk via the rotating body. The rotating body can be composed of, for example, a hub and a shaft. With a housing that supports the rotating body being configured as the conductive resin housing, components can be reduced in weight while maintaining conductivity. Also, because the conductive resin housing is made of a resin-molded article, the productivity thereof can be improved. As a conductive resin, a resin such as polyetherimide into which conductive filler such as carbon is mixed, can be used. In this case, the conductive filler is likely to lie on the surface of the molded article, and hence there is a tendency that a contact resistance becomes large or greatly varied, in spite of containing the conductive filler. When intending to secure conductivity by a conductive paint, a position and an area where the paint is applied are limited, and hence powering performance thereof is greatly affected by a large contact resistance or a large variation. Accordingly, an exposed portion where the inner layer of the conductive resin housing is exposed, is formed such that the conductive filler is exposed to the surface of the exposed portion. That is, the conductive paint is to be in contact with an area located in the inner layer of the conductive resin housing, in which the conductive filer is exposed and the contact resistance is stable, avoiding contact with an area located in the surface layer thereof in which the contact resistance is greatly varied. The exposed portion can be formed by, for example, eliminating part of the surface of the molded conductive resin housing, with cutting process or another process. As stated above, the conductive paint can be in direct contact with the area where the conductive filler is exposed by forming the exposed portion. Accordingly, the conductive rein housing in which the conduction with the base housing can be successfully performed even in the case where the conductive paint is partially applied, can be obtained. As a result, static electricity charged on the recording disk side can be discharged by smoothly sending the electricity to the base housing side.

In order to solve the aforementioned problems, another embodiment of the present invention relates to a disk drive device. The disk drive device comprises: a base housing configured to have conductivity in at least part thereof; a bearing unit configured to be arranged inside the base housing and to rotatably support a recording disk relative to the base housing; and a drive unit configured to rotationally drive the recording disk supported by the bearing unit, wherein the bearing unit includes: a rotating body configured to support the recording disk; a conductive housing configured to surround at least part of the rotating body to support the rotating body and to be able to conduct electricity to the recording disk via the rotating body; a non-conductive adhesive that is to be applied to part of the conductive housing to fix the conductive housing of the bearing unit arranged inside the base housing, to the inside thereof; and a conductive paint that is to be applied to secure conduction between the conductive housing and the base housing, and wherein the base housing or the conductive housing has, on an end surface thereof intersecting with a facing surface thereof facing that of the other, at least two stages of adhesive-reception grooves formed by carving the end surface in the extending direction of the facing surface.

It is preferable that the base housing and the bearing unit are firmly fixed together. To realize that, when the conductive housing of the bearing unit arranged inside the base housing is to be fixed to the inside of the base housing, the conductive housing is adhered thereto with a non-conductive adhesive not containing conductive filler, taking a serious view of adhesion property. In this case, the non-conductive adhesive protruding from the adhesion area sometimes expands to the area where the conductive paint is applied in order to secure the conduction between the conductive housing and the base housing. Namely, the non-conductive adhesive thus protruding is to hamper the conduction by the conductive paint. Accordingly, in the base housing or the conductive housing, at least two-stages of adhesive-reception grooves are formed on the end surface thereof intersecting with the facing surface thereof facing the other of the two, by carving the end surface in the extending direction of the facing surface. In the two stages of adhesive-reception grooves that receive the non-conductive adhesive, the groove in the first stage is designed to receive the non-conductive adhesive thus protruding, and the ridge line portion, the border between the two grooves, is designed to prevent the non-conductive adhesive from further expanding. As a result, the conduction between the base housing and the conductive housing, which are adhered together with the non-conductive adhesive, can be performed via the conductive paint, while the area to which the conductive paint is applied and to which the non-conductive adhesive never expands, being secured.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred-embodiments. This does not intend to limit the scope of the present invention, but to exemplify the invention.

Figure 1:
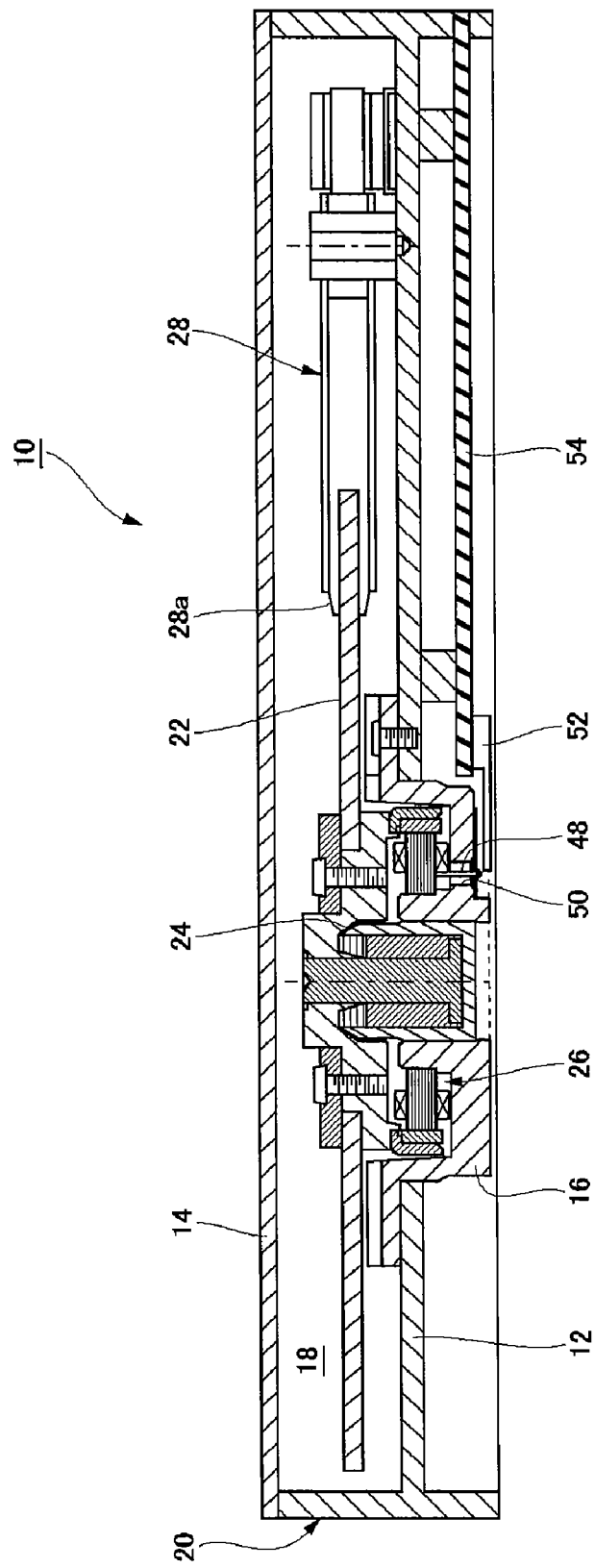
FIG. 1 is a schematic cross-sectional view illustrating the whole structure of a disk drive device according to the present embodiment.

Hereinafter, embodiments of the present invention will be described based on the accompanying drawings. FIG. 1 is a schematic cross-sectional view illustrating the whole structure of a disk drive device 10 according to the present embodiment.

The disk drive device 10 includes: a chassis 12 formed of a metal, for example, aluminum, the cross-section of which has an approximately concave shape; a cover 14 configured to cover the concave portion of the chassis 12, the cover 14 being made of, for example, a metal; and a housing 20 configured to form a closed space 18 by a base housing 16, a base for a bearing unit which will be described later. In the closed space 18 of the housing 20, a recording disk 22, a magnetic recording medium, is rotatably supported by the bearing unit 24. A drive unit 26 configured to rotationally drive the recording disk 22 is connected to the bearing unit 24. A head unit 28 configured to write/read data in/from the recording disk 22 by shaking a magnetic head 28a in the radial direction of the rotating recording disk 22, is arranged inside the housing 20.

Figure 2:
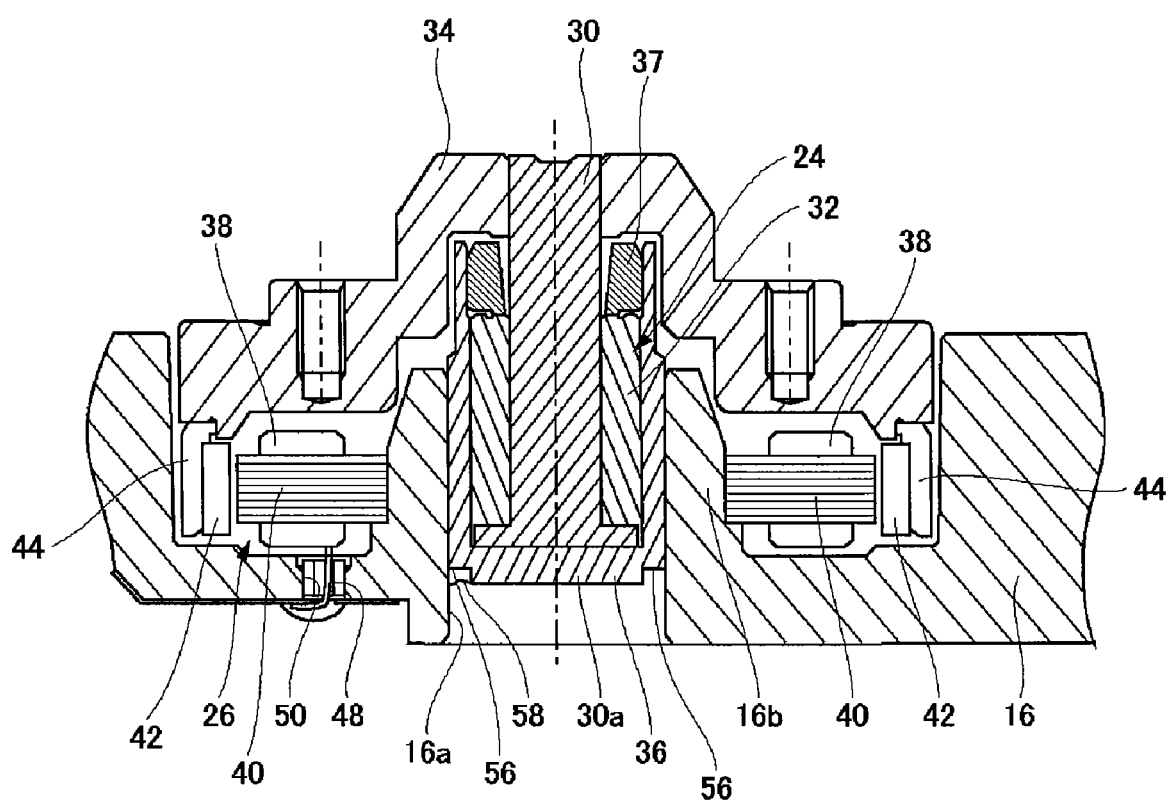
FIG. 2 is an enlarged schematic cross-sectional view of a bearing unit and a drive unit arranged inside the housing of the disk drive device according to the embodiment.

FIG. 2 is an enlarged schematic cross-sectional view of the bearing unit 24 and the drive unit 26 arranged inside the housing 20.

The bearing unit 24 is configured to include a shaft 30, a sleeve 32, a hub 34, a conductive resin housing 36 and a sealing member 37. In the present embodiment, a rotating body is composed of the shaft 30 and the hub 34. The base housing 16 of which part of the housing 20 is composed, has a circular opening portion 16a. The conductive resin housing 36 having an approximately cup-like shape is inserted through the circular opening portion 16a. In the case of FIG. 2, the conductive resin housing 36 is fixed to the inner wall surface of the circular opening portion 16a with a non-conductive adhesive, the adhesion performance of which is seriously taken into account. The shaft 30 is rotatably housed inside the cup-like shape of the conductive resin housing 36, the shaft 30 having a flange 30a for generating a dynamic pressure action on the base housing 16 side (lower end) and having the hub 34 fixed thereto on the other end (upper end). Further, the sleeve 32 configured to support the shaft 30 in a contactless manner while the shaft 30 is rotating, is arranged between the shaft 30 and the conductive resin housing 36, and the sleeve 32 is fixed to the inner wall of the conductive resin housing 36 with, for example, a non-conductive adhesive, etc. A lubricant is filled around shaft 30. The recording disk 22 is fixed to the hub 34 (see FIG. 1).

The bearing unit 24 used in the present embodiment is what is referred to as a dynamic bearing, and the flange 30a is formed at, for example, the end of the shaft 30, as stated above. A lubricant is filled in the space surrounded by the shaft 30, the flange 30a, the sleeve 32 and the conductive resin housing 36. Herringborn-shaped dynamic pressure grooves (not illustrated) are provided in a plurality of portions spaced apart from each other in the axial direction of the inner circumference of the sleeve 32, and provided on both the end surfaces of the flange 30a. Accordingly, a portion having a high pressure is generated in the lubricant due to the rotation of the flange 30a along with the shaft 30. The shaft 30 and the flange 30a are detached from the surrounding wall surface due to the pressure, making the shaft 30 be in a substantially contactless rotational state. Thereby, stable high-speed rotation of the recording disk 22 can be realized, allowing stable writing/reading of data to be executed.

As stated above, the base housing 16 and the conductive resin housing 36 can be combined together by a loose fit by fixing the two with a non-conductive adhesive, allowing an unnecessary external force to be applied to the conductive resin housing 36 during the assembly work. As a result, deformation of the sleeve 32 to be housed inside the conductive resin housing 36 can be prevented. By eliminating the deformation of the sleeve 32, accuracy of the gap formed between the sleeve 32 and the shaft 30 when the shaft 30 arranged in the inner circumferential portion of the sleeve 32 is rotated, can be maintained, allowing the rotation of the sleeve 32 to be stable. Further, because the recording disk 22 can be stably rotated, a rotational load during the rotation is reduced, allowing the recording disk to be driven with low power consumption.

By forming part of the components of the bearing unit 24 with resin molded articles such as the conductive resin housing 36, the component can be mass-produced at a low cost while the performance thereof being secured, allowing the bearing unit 24 to be produced at a low cost. As a result, the disk drive device 10 can be produced at a low cost. A resin produced by mixing conductive filler such as carbon into a resin such as polyetherimide can be used as a conductive resin in molding the conductive resin housing 36.

A stator core 40 wounded with a plurality of coils 38 that generate magnetism are fixed to the outer wall surface of an opening wall surface 16b by which the circular opening portion 16a of the base housing 16 is formed. Further, A rotor yoke 44 supporting a magnet 42 is fixed to the hub 34 that is fixed to the shaft 30 such that the stator core 40 and the magnet 42 face each other. The hub 34 can be rotated by facing together the stator core 40 and the magnet 42 so as to create a slight gap between the two, and by making a current flow through the coil 38 in accordance with a rotational position of the magnet 42. That is, the magnet 42, the rotor yoke 44, the hub 34 and the shaft 30 function as a rotor relative to a stator on the side of the base housing 16, the coil 38 and the stator core 40, allowing the recording disk 22 to be rotated at a predetermined speed and in a predetermined direction.

A through-hole 50 that leads an outgoing line 48 pulled out from the coil 38, to the outside of the housing 20, is formed in part of the base housing 16. The outgoing line 48 pulled out from the through-hole 50 is connected to a circuit board 54 via a connector 52, allowing power supply and exchange of signals to be executed, if necessary (see FIG. 1).

In the disk drive device 10 structured as stated above, because the recording disk 22 is rotated at a high-speed in air, the disk is sometimes charged with static electricity. If the recording disk 22 is charged with massive static electricity, discharge breakdown of the magnetic head 28a or breakdown of the data recorded on the recording disk 22, may be caused. In order to prevent the recording disk 22 from being charged with static electricity as stated above, a conductive path that grounds the static electricity charged in the recording disk 22 has to be secured. To realize this, the bearing unit 24 in the disk drive device 10, which supports the recording disk 22, is composed of a plurality of components having conductivity. Specifically, the bearing unit 24 is composed of the hub 34 on which the recording disk is mounted, the shaft 30 to which the hub 34 is fixed, the sleeve 32 in which the shaft 30 is housed, and the conductive resin housing 36 that supports the sleeve 32. The disk drive device 10 has the structure in which static electricity can be discharged to the base housing 16 side by providing each component with conductivity to form a conductive path.

As stated above, the conductive resin housing 36 and the base housing 16 are adhered together with the non-conductive adhesive, taking a serious view of fixed strength. If the non-conductive adhesive is used, the conduction between the conductive resin housing 36 and the base housing 16 cannot be obtained, while the adhesion strength between the two are being sufficiently secured. Accordingly, the conductive path is partially secured by applying the conductive paint to an area where the non-conductive adhesive is not located. As an example of the conductive paint, for example, a conductive adhesive produced by containing conductive filler such as carbon into a silicone resin such as a cold setting type or a heat setting type.

On the other hand, as a conductive resin to be the base material of the conductive resin housing 36, a resin produced by mixing conductive filer such as carbon into a resin such as polyetherimide can be used, as stated above. However, when injection molding is performed with the use of a metal mold, the conductive filler is likely to lie on the surface of the molded article, and hence there is a tendency that a contact resistance becomes large or greatly varied, in spite of presence of the conductive filler. Accordingly, even if a conductive adhesive that is limited in terms of application position or amount of application, is applied, stable conduction property cannot be obtained in some cases.

Figure 3A:
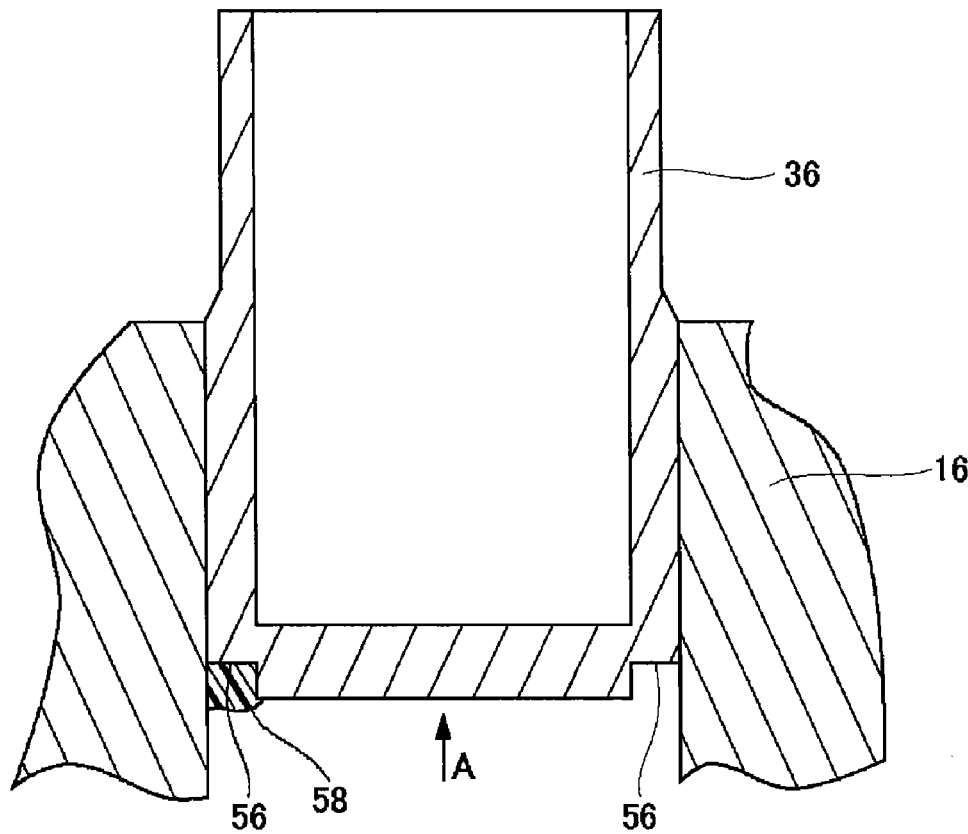
FIG. 3A is an enlarged vertical cross-sectional view of a conductive resin housing.
Figure 3B:
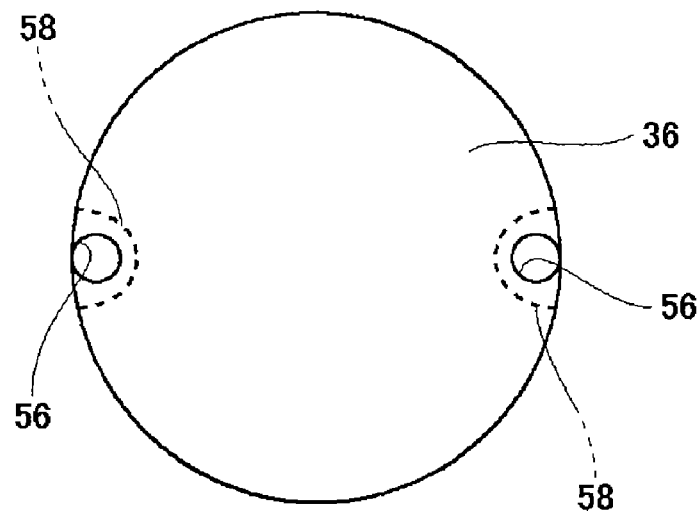
FIG. 3B is an end elevation view of the conductive resin housing, seen from the arrow A side in FIG. 3A.

Therefore, in the present embodiment, an exposed portion 56 where the inner layer of the conductive resin housing 36 is exposed is formed, as illustrated in FIGS. 2, 3A and 3B. FIG. 3A is an enlarged vertical cross-sectional view of the conductive resin housing 36, and FIG. 3B is an end elevation view of the conductive resin housing 36, seen from the arrow A side of FIG. 3A. Herein, assuming that the portion of the resin-molded conductive resin housing 36 that is in contact with a metal mold, is the "surface layer", the inner layer of the conductive resin housing 36 means the portion located deeper than that. As stated above, the surface of a molded article produced by metal molding using a conductive resin is likely to have a high contact resistance because the conductive filler is hardly exposed. Also, distribution of the conductive filler is not stabilized, and hence there is a tendency that the contact resistance itself is greatly varied. On the other hand, the conductive filler is located almost uniformly in the inner layer, and hence the contact resistance is less varied and is stabilized. Accordingly, the conduction between the conductive resin housing 36 and the base housing 16 can be stabilized by applying the conductive adhesive 58, as a conductive paint, to an area including the exposed portion 56 in the conductive resin housing 36, and by contacting another part of the conductive adhesive 58 with the base housing 16.

The exposed portion 56 can be readily formed by, for example, machining the end surface of the metal-molded conductive resin housing 36 with the use of a cutting tool such as an end mill. In FIG. 3A and FIG. 3B, an example in which two exposed portions 56 are formed is illustrated. The number of the exposed portions 56 thus formed and the size or the depth of the exposed portion 56 can de determined in the design stage, taking into consideration of the size of the conductive resin housing 36 or how high the contact resistance is.

A position where the exposed portion 56 is formed can be appropriately selected as far as the exposed portion 56 and the base housing 16 can be conductively connected together via the conductive adhesive 58. As illustrated in FIGS. 2 and 3A, however, when the exposed portion is formed near the inner wall of the base housing 16, a conductive treatment can be surely performed by applying a small amount of the conductive adhesives 58. As a result, the disk drive device can be made at a lower cost due to improvement of work efficiency and reduction in use amount of the conductive paint. Good conduction property between the base housing 16 and the exposed portion 56 can be obtained when part of the conductive adhesive 58 is in contact with the base housing 16 and another part thereof is in contact with the exposed portion 56. In another embodiment, the conductive adhesive 58 may be applied so as to cover the whole exposed portion 56. By forming the exposed portion 56, the conductive filler, processing wastes remaining in the exposed portion 56, or the like, is sometimes released as a contamination. As illustrated in FIG. 1, the contamination released after the closed space 18 is formed sometimes causes a dielectric breakdown or a head crash. As stated above, by completely covering the exposed portion 56 that can be a place from which the contamination is released, with the conductive adhesive 58, it becomes possible that the conductive adhesive 58 functions as a sealing member for preventing a contamination from being released, allowing the quality of the disk drive device to be improved. Further, the exposed portion 56 serves as a mark indicating the place to which the conductive adhesive 58 is applied, allowing the efficiency of assembly work and the accuracy of work to be improved.

When the conductive resin housing 36 is produced by injection molding with the use of a metal mold, a melting conductive resin is supplied to the space inside the metal mold from a gate, an injection hole. Accordingly, a gate remnant, a trace of an injection path, remains in the molded conductive resin housing 36. The gate remnant is usually performed with removal processing such as cutting. Accordingly, the cross section from which the gate remnant is removed becomes the inner layer, which has not been in contact with the metal mold. That is, the portion from which the gate remnant is removed can be made the exposed portion 56. In other words, by performing the removal processing on the gate remnant, which is necessarily generated in a resin molded article, the exposed portion 56 can be concurrently formed, allowing the exposed portion 56 by which the conduction performance thereof can be improved, to be formed without an increase in the number of processes in comparison with a conventional method. As stated above, by forming the exposed portion 56 correspondently to the gate remnant, the conductive resin housing 36 in which the conduction with the base housing 16 is successfully performed, can be obtained efficiently and at a low cost. But, there is a possibility that the inner layer may be a place from which a contamination is released due to the exposure of the inner layer of the gate remnant by the removal processing. However, by matching the gate remnant with the exposed portion 56 and by applying the conductive adhesive 58 thereto as in the present embodiment, the conductive adhesive 58 functions as a sealing member for preventing a contamination from being released, as stated above.

Figure 4:
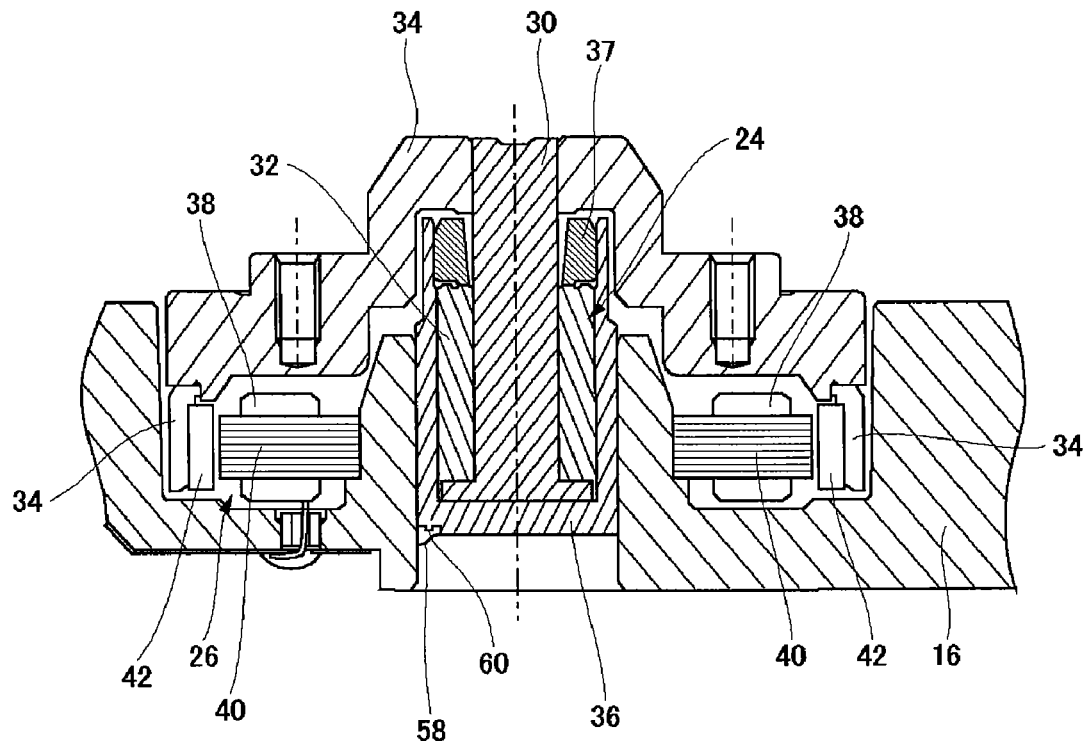
FIG. 4 is a schematic view illustrating the structure of a bearing unit configured by using a conductive resin housing, the gate remnant of which is an exposed portion, in the disk drive device according to the embodiment.

FIG. 4 is a schematic view illustrating the structure of the bearing unit 24 configured by using the conductive resin housing 36, the gate remnant 60 of which is changed to the exposed portion. FIG. 4 illustrates the same structure as in the FIG. 2, except that the conductive resin housing 36, the gate remnant 60 of which is changed to the exposed portion, is used. Accordingly, a member having the same function will be denoted with the same reference numeral and description thereof will be omitted.

A gate position used in the injection molding is determined, taking into consideration of efficiency in injecting a rein and "sink" occurring when the resin is cooled. In this case, if the gate position is determined so as to be in the position corresponding to the proximity of the inner wall of the base housing 16 as illustrated in FIG. 4, a conduction treatment can be surely performed by applying a small amount of the conductive adhesive 58, in the same way as illustrated in FIGS. 3A and 3B; and the disk drive device can be produced at a low cost due to improvement of work efficiency and reduction in the use amount of the conductive paint. Further, by covering, with the conductive adhesive 58, the whole portion from which the gate remnant 60 is removed, it becomes possible that the conductive adhesive 58 functions as a sealing member for preventing a contamination from being released, from the area where the inner layer is exposed by the removal processing, allowing the quality of the disk drive device to be improved. The removal processing of the gate remnant 60 may be one in which the gate remnant 60 is broken in a simple way, or another in which the portion is cut off or trimmed with a tool. Further, the gate remnant 60 may be shaped such that the portion 60 is easily removed or the inner layer thereof is efficiently exposed.

Figure 5:
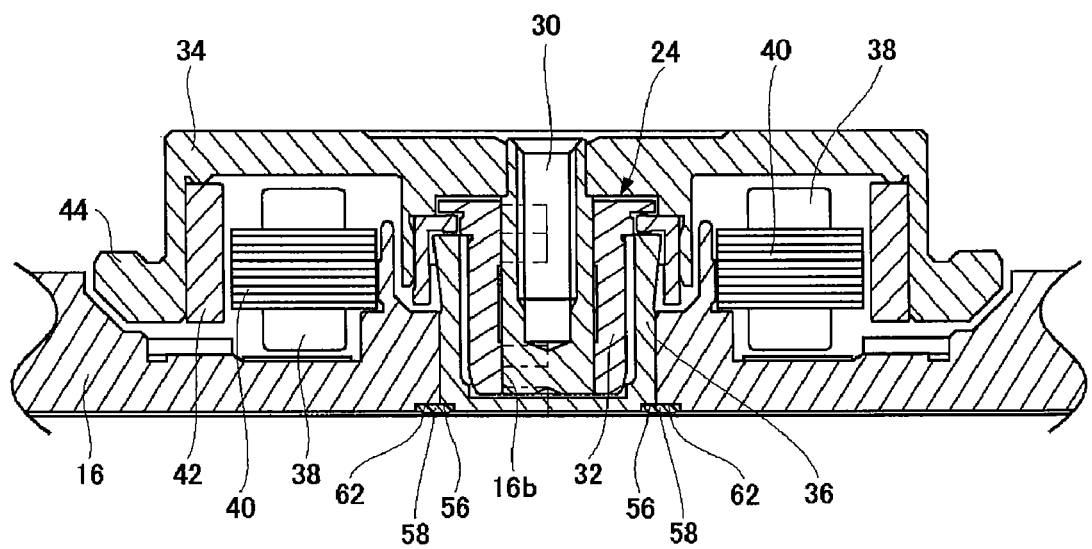
FIG. 5 is a view illustrating a bearing unit according to an embodiment different from that in FIG. 2.
Figure 6:
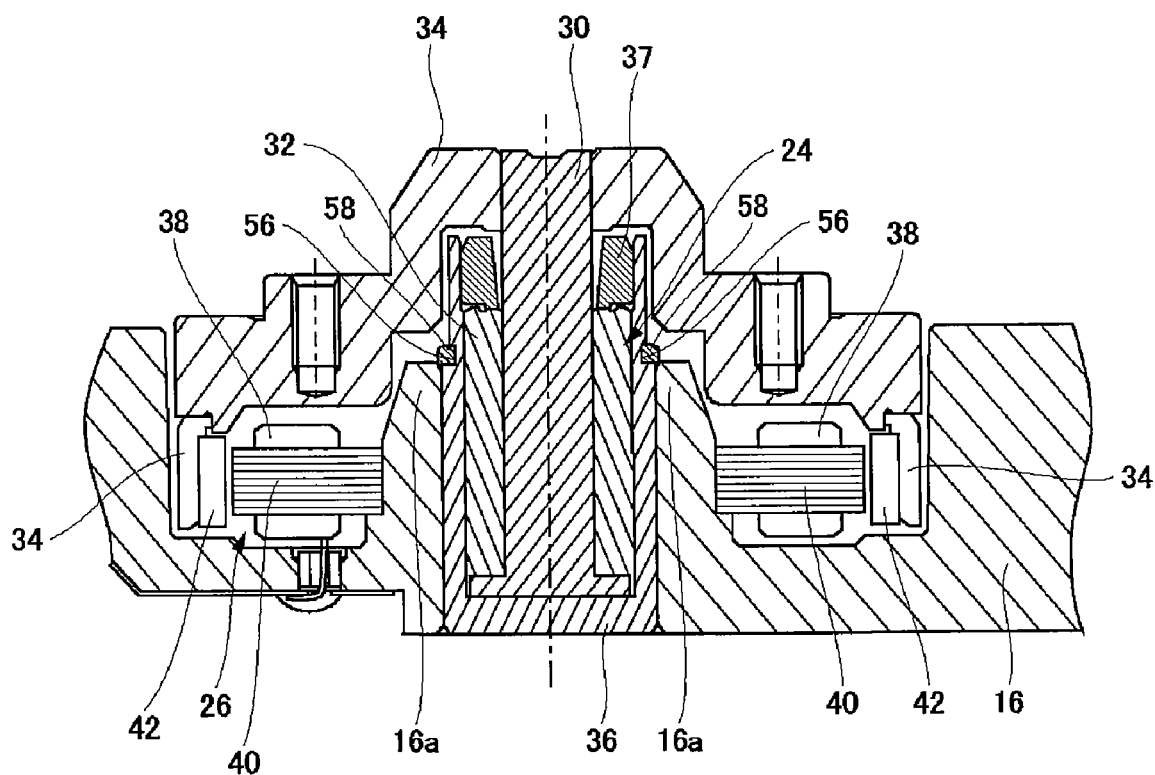
FIG. 6 is a view illustrating a bearing unit according to an embodiment different from that in FIG. 2.

FIGS. 5 and 6 illustrate bearing units 24 according to embodiments different from that in FIG. 2. A member having the same function as that in FIG. 2 will be denoted with the same reference numeral, and description thereof will be omitted. FIG. 5 illustrates the bearing unit 24 used in a small disk drive device mounted in a so-called 2.5 inch HDD. In the case of FIG. 5, the exposed portion 56 is formed on the end surface of the conductive resin housing 36 in the same way as in FIG. 2. As illustrated in FIG. 5, the end surface of the conductive resin housing 36 is fixed at almost the same height as that of the base housing 16, and hence a concave portion 62 extending to the exposed portion 56 is also formed on the base housing 16 side. By applying the conductive adhesive 58 to a groove formed by the exposed portion 56 and the concave portion 62, good conduction between the base housing 16 and the conductive resin housing 36 can be realized. Further, because the conductive adhesive 58 is housed in the groove formed by the exposed portion 56 and the concave portion 62, it is prevented that the conductive adhesive 58 is erroneously touched, thereby preventing the conductive adhesive 58 from peeling off or falling off during assembly work or conveyance.

If the gate remnant 60 is designed to be formed in the exposed portion 56, the effect equivalent to that described in FIG. 4 can be obtained. As stated above, in the case of FIG. 5, the end surface of the conductive resin housing 36 is fixed at almost the same height as that of the base housing 16. Accordingly, it is preferable that a concave portion connected to the concave portion 62 is formed in advance by forming the gate remnant 60 at a position one stage deeper than the end surface of the conductive resin housing 36, and the portion 60 is formed in the concave portion thus formed. Further, the concave portion serves as a mark indicating the place to which the conductive adhesive 58 is applied, allowing the efficiency of assembly work and the accuracy of work to be improved.

FIG. 6 illustrates an example in which the bearing stability of the bearing unit 24 is improved by extending, in the axial direction, the unit 24 including the shaft 30 so as to be longer than that in the example of FIG. 2. FIG. 6 illustrates an example in which the conduction with the conductive resin housing 36 is secured at the hub side end portion of the circular opening portion 16a of the base housing 16. In this case, the exposed portion 56 is formed at a position corresponding to the hub side end portion of the circular opening portion 16a, that is, formed in the intermediate portion of the conductive resin housing 36, so that the conductive adhesive 58 is applied. Thereby, good conduction between the base housing 16 and the conductive resin housing 36 can be realized. If the gate remnant 60 is formed in the exposed portion 56, the same effect as described in FIG. 4 can be obtained. When the gate remnant 60 is located in the portion, the gate remnant sometimes interferes during the assembly work of the base housing 16 and the conductive resin housing 36, and hence it is preferable that the removal processing is carefully performed. In another example, in the same way as in FIG. 5, a concave portion is formed in advance by forming the gate remnant 60 at a position one stage deeper than the side surface of the conductive resin housing 36, and the portion 60 is formed in the concave portion thus formed. With such a structure, the removal processing of the gate remnant 60 can be simplified, allowing production efficiency to be improved. Further, the concave portion serves as a mark indicating the place to which the conductive adhesive 58 is applied, allowing the efficiency of assembly work and the accuracy of work to be improved.

As stated above, in order to secure the joint strength, the base housing 16 and the conductive resin housing 36 are adhered together with a non-conductive adhesive not containing conductive filler, taking a serious view of adhesion strength. In this case, as stated above, the conductive paint is applied to secure the conduction between the base housing 16 and the conductive resin housing 36. However, the non-conductive adhesive sometimes protrudes from the surface to be adhered because the base housing 16 and the conductive resin housing 36 are closely adhered together. Further, the non-conductive adhesive thus protruding sometimes expands to the area to which the conductive paint is to be applied. In this case, the conduction between the two are hindered by the non-conductive adhesive, in spite of applying the conductive paint. Likewise, this problem also occurs in the case where the conductive housing and the base housing 16, which are formed of a metal, etc., are adhered together with the non-conductive adhesive. In the following descriptions, the conductive housing includes the conductive resin housing 36.

Figure 7A:
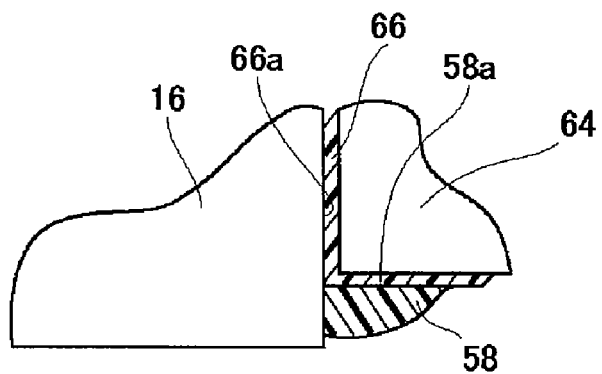
FIGS. 7A to 7D are schematic views schematically illustrating the cases where the base housing and the conductive housing are adhered together with a non-conductive adhesive, in the disk drive device according to the embodiment.

FIGS. 7A to 7D are schematic views schematically illustrating the cases where the base housing 16 and a conductive housing 64 are adhered together with a non-conductive adhesive 66. FIG. 7A illustrates a state where, when the base housing 16 and the conductive housing 64 are adhered together with the non-conductive adhesive 66, the non-conductive adhesive 66 protrudes from the surface 66a to be adhered and the adhesive 66 thus protruding expands to an area 58a to which the conductive adhesive 58 is to be applied. The base housing 16 and the conductive housing 64 are usually applied with the non-conductive adhesive 66, and after the adhesive 66 is cured, the two are applied with the conductive adhesive 58, and hence the conduction between the two cannot be obtained even when the conductive adhesive 58 is applied, as illustrated in FIG. 7A.

Figure 7B:
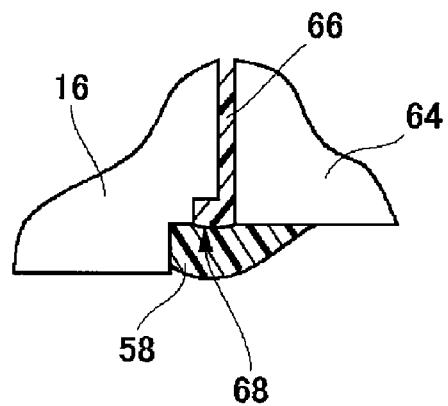

Therefore, in the present embodiment, at least two stages of adhesive-reception grooves 68, on an end surface of the base housing 16 intersecting with a facing surface thereof facing that of the conductive housing 64, are formed by carving the end surface in the extending direction of the facing surface, as illustrated in FIG. 7B. The cubic capacity of the adhesive-reception groove 68 in the first stage, located on the back side, may be larger than an amount of the adhesive 66 that protrudes, the amount of the adhesive being measured by a test relative to an application amount thereof, in advance. The adhesive-reception grooves 68 in the first stage is designed to receive the non-conductive adhesive 66 thus protruding, and the ridge line portion, the border between the two grooves, is designed to prevent the non-conductive adhesive 66 from further expanding, and that in the second stage, located on the near side, is designed to house the conductive adhesive 58. As a result, while securing an area to which the conductive adhesive 58 is applied and to which the non-conductive adhesive 66 never expands, the conduction between the base housing 16 and the conductive housing 64, which are adhered together with the non-conductive adhesive 66, can be successfully performed via the conductive adhesive 58. With the adhesive-reception grooves 68 configured in multiple stages as stated above, the non-conductive adhesive 66 is to be housed in the first stage of the grooves located on the back side. Then, by applying the conductive adhesive 58 to the second stage of the grooves, the adhesive can be easily prevented from protruding from the bottom surface of the base housing 16, while securing the conductivity between the base housing 16 and the conductive housing 64. Further, because the conductive adhesive 58 is suppressed from protruding from the base housing 16, it can be prevented that an unnecessary external force is applied to the conductive adhesive 58 during conveyance or assembly work of the disk drive device 10. Thereby, peeling of the conductive adhesive 58 can be prevented, allowing the reliability of the disk drive device 10 to be improved.

Figure 7C:
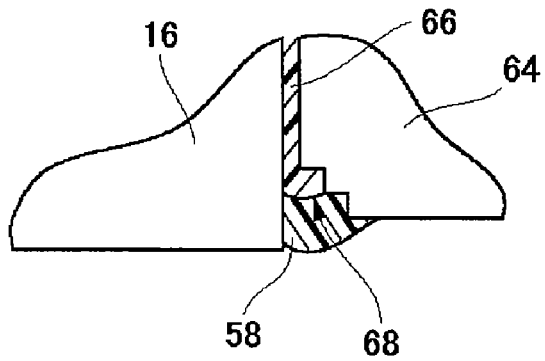

FIG. 7C illustrates an example in which the adhesive-reception groove 68 is provided on the conductive housing 64 side. Also, in this case, the adhesive-reception groove 68 in the first stage, located on the back side, receives the non-conductive adhesive 66 protruding, and the application area to which the conductive adhesive 58 is applied and to which the non-conductive adhesive 66 never expands, can be secured. As a result, the conduction between the base housing 16 and the conductive housing 64, which are adhered together with the non-conductive adhesive 66, can be successfully performed via the conductive adhesive 58.

Figure 7D:
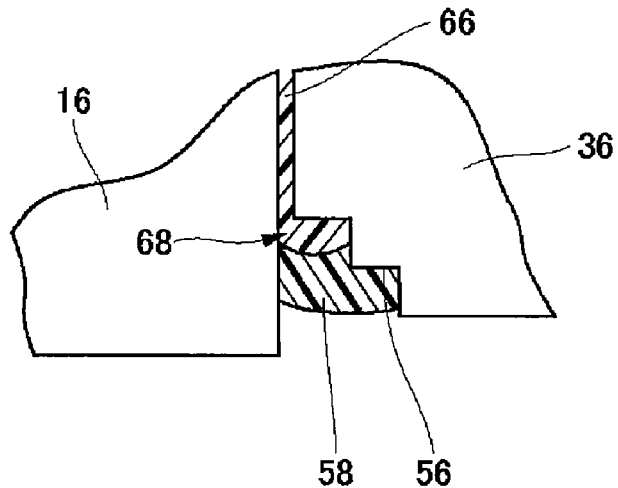

FIG. 7D illustrates an example in which the adhesive-reception grooves 68 in FIG. 7C are applied to the conductive resin housing 36 described in FIG. 3A. Also, in this case, the adhesive-reception groove 68 in the first stage, located on the back side, is designed to receive the non-conductive adhesive 66 protruding such that the non-conductive adhesive 66 never enters the exposed portion 56. As a result, the application area to which the conductive adhesive 58 is applied, can be secured in the exposed portion 56. That is, the conduction between the base housing 16 and the conductive resin housing 36, which are adhered together with the non-conductive adhesive 66, can be successfully performed via the conductive adhesive 58.

The present invention should not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A disk drive device comprising:
a base housing configured to have conductivity in at least part thereof, said base housing having an inner wall surface;
a bearing unit configured to be arranged inside the base housing and to rotatably support a recording disk relative to the base housing; and
a drive unit configured to rotationally drive the recording disk supported by the bearing unit,
wherein the bearing unit includes:
a conductive rotating body configured to support the recording disk;
a conductive resin housing configured to surround at least part of the rotating body to support the rotating body and to be able to conduct electricity to the recording disk via the rotating body, said conductive resin housing being fixed to said inner wall surface of said base housing by a non-conductive adhesive; and
a conductive adhesive applied between the conductive resin housing and the base housing to secure conduction between the conductive resin housing and the base housing,
wherein the conductive resin housing has an exposed portion adjacent to said base housing and not covered by said non-conductive adhesive but covered by the conductive adhesive, and wherein the exposed portion is coated with the conductive adhesive to secure conduction between the conductive resin housing and the base housing.

2. The disk drive device according to claim 1, wherein static electricity charged in the recording disk is smoothly discharged to the base housing via the exposed portion and the conductive adhesive.

3. The disk drive device according to claim 1, wherein the conductive resin housing is mixed with conductive filler.

4. The disk drive device according to claim 3, wherein the conductive filler is exposed to the surface of the exposed portion.

5. The disk drive device according to claim 4, wherein the conductive adhesive is in direct contact with the conductive filler.

6. The disk drive device according to claim 1, wherein the conductive resin housing contains carbon.

7. The disk drive device according to claim 1, wherein the conductive resin housing contains polyetherimide.

8. The disk drive device according to claim 1, wherein the exposed portion is configured as an area corresponding to a position of a gate remnant that remains at an area from which a resin is injected in molding the conductive resin housing.

9. The disk drive device according to claim 8, wherein the gate remnant is formed in a concave portion formed on the end surface of the conductive resin housing.

10. The disk drive device according to claim 1, wherein the exposed portion is formed near the inner wall of the base housing.

11. The disk drive device according to claim 1, wherein the conductive adhesive covers the whole exposed portion.

12. A disk drive device comprising:
a base housing configured to have conductivity in at least part thereof;
a bearing unit arranged inside the base housing and configured to rotatably support a recording disk relative to the base housing; and
a drive unit configured to rotationally drive the recording disk supported by the bearing unit, wherein the bearing unit includes:
a rotating body configured to support the recording disk;
a conductive housing configured to surround at least part of the rotating body to support the rotating body and configured to conduct electricity to the recording disk via the rotating body;
the conductive housing fixed inside the base housing by a non-conductive adhesive; and
a conductive adhesive applied between the conductive housing and the base housing to secure conduction therebetween, and
wherein one of the base housing and the conductive housing has, on an end surface thereof intersecting with a facing surface thereof facing that of the other of the base housing and the conductive housing, at least two stages of adhesive-reception grooves.

13. The disk drive device according to claim 1, wherein
one of the base housing and the conductive resin housing has, on an end surface thereof intersecting with a facing surface thereof facing that of the other of the base housing and the conductive resin housing, at least two stages of adhesive-reception grooves.

14. The disk drive device according to claim 12, wherein static electricity charged in the recording disk is smoothly discharged to the base housing via the conductive adhesive.

15. The disk drive device according to claim 12, wherein the conductive housing is mixed with conductive filler.

16. The disk drive device according to claim 15, wherein the conductive adhesive is in direct contact with the conductive filler.

17. The disk drive device according to claim 12, wherein the conductive housing contains carbon.

18. The disk drive device according to claim 12, wherein the conductive housing contains polyetherimide.

* * * * *